## (12) United States Patent
Komuro

(10) Patent No.: US 6,195,678 B1
(45) Date of Patent: *Feb. 27, 2001

(54) REMOTE RESOURCE MANAGEMENT SYSTEM FOR AUTOMATICALLY DOWNLOADING REQUIRED FILES FROM APPLICATION SERVER DEPENDING ON CONTENTS OF SELECTED FILES ON REQUESTING COMPUTER

(75) Inventor: Toshinao Komuro, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/795,724

(22) Filed: Feb. 4, 1997

(30) Foreign Application Priority Data

Sep. 3, 1996 (JP) .................................................. 8-233228

(51) Int. Cl.[7] .......................... G06F 15/16; G06F 15/167
(52) U.S. Cl. .......................... 709/202; 709/219; 709/213; 709/203; 709/216
(58) Field of Search .................... 395/200.09, 200.06, 395/712, 500; 707/10, 104, 1; 709/228, 202, 219, 213, 203, 216; 364/468.15

(56) References Cited

U.S. PATENT DOCUMENTS 5,630,066 * 5/1997 Gosling ........................... 395/200.09
5,752,246 * 5/1998 Rogers et al. ........................... 707/10
5,774,656 * 6/1998 Hattori et al. .................. 395/200.06
5,797,016 * 8/1998 Chen et al. ........................... 395/712
5,802,526 * 9/1998 Fawcett et al. ....................... 707/104
5,809,287 * 9/1998 Stupek, Jr. et al. ................. 395/500
5,847,957 * 12/1998 Cohen ............................. 364/468.15
5,848,246 * 12/1998 Gish .................................... 709/228

* cited by examiner

Primary Examiner—Le Hein Luu
(74) Attorney, Agent, or Firm—Staas & Halsey LLP

(57) ABSTRACT

A remote resource management system for maintaining resources shared in a distributed computing system, which downloads only such resources that are the most suitable for an application requested by a user. When a user selects an application at a terminal computer, an application server computer providing the selected application will determine the most suitable resources for the selected application by consulting a resource linkage manager disposed therein. The application server transfers information advising the suitable resources, together with a download agent, to the terminal computer. In the terminal computer, the download agent determines whether the resources should be newly downloaded or not, referring to local resource management information that describes what resources exist in the terminal computer. If downloading is necessary, the resource management system locates the necessary resource files by using a downloadable resource management directory in a resource server computer. The resource files are downloaded from downloadable resource storage in the resource server computer, and installed into the terminal computer system according to a specified installation mode. When the installation is finished, the download agent will be unloaded, and the application runs with the downloaded resources.

23 Claims, 13 Drawing Sheets

| APPLICATION NAME | SUITABLE RESOURCE | | RESOURCE SERVER NAME |
|---|---|---|---|
| | RESOURCE NAME | VERSION NUMBER | |
| X1 | P1 | 1.0 OR LATER | A11 |
| | P2 | 2.0 OR LATER | A11 |
| Y1 | P1 | 1.0 OR LATER | A11 |
| | P3 | 2.0 OR LATER | A11 |
| ... | ... | ... | ... |

| RESOURCE FILE INFORMATION | | | RESOURCE DESTINATION INFORMATION | | | |
|---|---|---|---|---|---|---|
| RESOURCE NAME | VERSION NUMBER | SOURCE FILE NAME | DESTINATION FILE NAME | FILE TYPE | INSTALLATION MODE | POWER CYCLING |
| P1 | 1.0 | F11 | XX.F1 | USER | AUTO (INSTALLER-BASED) | NOT REQUIRED |
| P2 | 2.0 | F12 | XX.F2 | SYSTEM | AUTO (SYSTEM-LINKED) | REQUIRED |
| P3 | 1.0 | F13 | XX.F3 | USER | MANUAL | NOT REQUIRED |
| | 2.0 | F14 | XX.F4 | SYSTEM | AUTO (SYSTEM-LINKED) | SYSTEM-LINKED |
| | ... | ... | ... | ... | ... | ... |

| RESOURCE FILE INFORMATION | | | ...... |
|---|---|---|---|
| RESOURCE NAME | VERSION NUMBER | SOURCE FILE NAME | ...... |
| P1 | 1.0 | xx.F11 | ...... |

H11

REMOTE RESOURCE MANAGEMENT SYSTEM FOR AUTOMATICALLY DOWNLOADING REQUIRED FILES FROM APPLICATION SERVER DEPENDING ON CONTENTS OF SELECTED FILES ON REQUESTING COMPUTER

BACKGROUND OF THE INVENTION

1. Field of the Invention

The present invention generally relates to a remote resource management system for maintaining remote resources in a distributed computing environment. More specifically, the present invention relates to a remote resource management system for maintaining remote resources downloadable to terminal computers, which are typically personal computers, in a distributed heterogeneous computing environment where a plurality of platforms for different applications are interconnected by a public telecommunications service or a local area network (LAN).

2. Description of the Related Art

Unlike stand-alone systems, terminal computers working in a network computing environment need not have all software and data resources in their local storage. Instead, they can download such resources from a server computer via a network, when a specific application is requested.

Assume here that a user has a video data file, for example, and he/she is attempting to play it on his terminal computer. The video requires a movie player program of a certain version or later, but the terminal computer may not have such a program or, even if the computer has one, the version of the movie player program may be too old to support the data format of that video data file. If this is the case, the terminal computer will download the required movie player program from an appropriate server before playing the video.

As illustrated above, terminal computers in a distributed environment can share some software resources and/or data resources, which are referred to as downloadable resources. Such downloadable resources, however, must be managed and maintained in a proper way to ensure reliable operations in the terminal computers.

FIG. 12 shows an example of a conventional management system for shared software resources. In this example, a network N101 interconnects a server computer A101 and three terminal computers T101, T102, and T103, thereby forming a distributed computing system. The server computer A101 has downloadable resource storage D101 to hold downloadable resources and a downloadable resource directory B101 to manage the resources. Specifically, the downloadable resource storage D101 stores three resources F101, F102, and F103 in separate files.

Those resource files are classified into groups according to their respective usage in the terminal computers T101–T103. In this example, the resource F101 belongs to a resource group G1, while the other resources F102 and F103 belong to a resource group G2.

The downloadable resource directory B101 manages the relationship between the terminal computers and the resources available in the downloadable resource storage D101. As noted in FIG. 12, the downloadable resource directory B101 defines that the group-G1 resource is destined for the terminal computer T101, and that the group-G2 resources are for the terminal computers T102 and T103.

In one type of operation, the server computer A101 takes the initiative in downloading the resources. The server computer A101 first sets up a logical connection to each of the terminal computers T101–T103, and then transfers the resource files F101–F103 to them according to the terminal-resource relationships which are registered in the downloadable resource directory B101. That is, the resource file F101 belonging to the resource group G1 is downloaded to the terminal computer T101, while the resource files F102 and F103 belonging to the resource group G2 are delivered together to the terminal computers T102 and T103.

In another type of operation, each terminal computer takes the initiative in downloading resource files. For example, the terminal computers T101, T102, and T103 establish a logical connection to the server computer A101 upon their power-up, and independently download the resource files F101–F103 from the server computer A101 according to the downloadable resource directory B101.

In the above-described distributed computing system, however, the resource group definition registered in the downloadable resource directory B101 may include some files that are not immediately necessary for a terminal computer. Downloading of resource files including such unnecessary ones can impact the storage capacity of a local hard disk in the terminal computer, as well as consuming much time to transfer a large amount of data. Since data resources for multimedia applications are generally large in size, such concentrated downloading of a predefined group of multimedia data files is particularly time-consuming and storage-intensive.

FIG. 13 shows another example of a conventional remote resource management system. In this system, a server computer A111 working as a file server and a plurality of terminal computers, say, three terminal computers T111, T112, and T113 are interconnected by a network N111. The server computer A111 has downloadable resource storage D111, where all resources F111, F112, and so on are collected.

Upon demand, the terminal computers T111, T112, and T113 download necessary resources selected from among the resources F111, F112, and so on, which are stored in the server computer A111 as the common resources. The server computer A111 is maintained by a system operator who reloads necessary resource files when some programs should be updated.

On the terminal side, however, there is no such specialist or management mechanism responsible for maintenance of the downloadable resources. Therefore, each terminal user must maintain the local resources by downloading new program files individually from the server to his/her own terminal computer, when it becomes necessary. That is, the latest resource files in the server computer are not automatically delivered to the terminal computers. In the case that some resources are updated quite often, the terminal users are frequently requested to maintain the versions of such resources. Frequent update of those downloadable resources will force the terminal users to spend much time for reinstallation of them.

SUMMARY OF THE INVENTION

Taking the above into consideration, an object of the present invention is to provide a system for maintaining remote resources in a distributed computing system where only such resources that are necessary and the most suitable for an application will be downloaded.

To accomplish the above object, according to the present invention, there is provided a remote resource management system for maintaining remote resources shared in a distributed computing system. In the distributed computing system, a plurality of computers are interconnected by a network and the shared remote resources are downloaded from a resource server computer to a requesting computer on demand. The remote resource management system comprises the following four elements.

A first element is downloadable resource storage means, which is disposed in the resource server computer, for storing downloadable resources each containing at least one file. A second element is downloadable resource management means, which is disposed in the resource server computer, for managing information concerning the downloadable resources. A third element is download agent means, which is stored in a computer on the network and delivered to the requesting computer in response to a request from the requesting computer, for executing a download operation to fetch one of the downloadable resources from the downloadable resource storage means, according to a system environment of the requesting computer. A fourth element is local resource information management means, which is disposed in the requesting computer, for storing information concerning local resources in the requesting computer, under control of the download agent means that is delivered to the requesting computer.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3(A) is a diagram showing an example of a resource linkage directory;

FIG. 3(B) is a diagram showing an example of a downloadable resource directory;

DESCRIPTION OF THE PREFERRED EMBODIMENT

The present invention will be outlined below with reference to the accompanying drawings.

Figure 1:
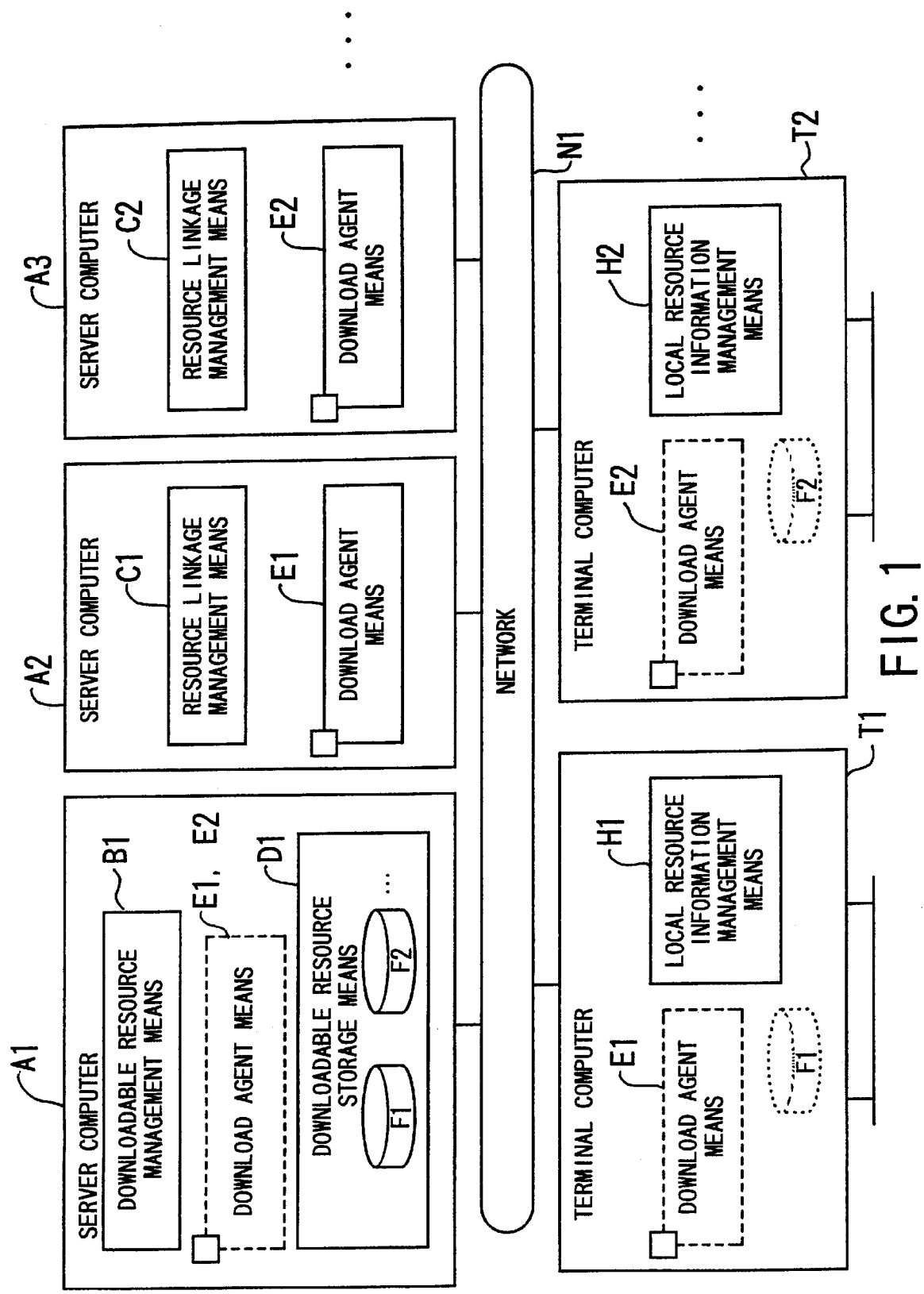
FIG. 1 is a conceptual view of a remote resource management system according to the present invention, which manages software resources shared in a distributed computing system.

FIG. 1 is a conceptual view of a distributed computing system employing a remote resource management system in which the present invention is implemented. This distributed system includes a plurality of server computers A1, A2, A3, and so on, which manage downloadable resources or provide applications to users. The system also involves a plurality of terminal computers T1, T2, and so on, where users use their desired applications. Those server and terminal computers are interconnected by a network N1, thereby allowing distributed computing operations.

One of the server computers in the system takes care of downloadable resources shared by other computers and, for that purpose, it has means for storing such resources and managing information about the resources. In the illustrated system, the server computer A1 takes this role. Specifically, the server computer A1 has downloadable resource storage means D1 for storing downloadable resources F1, F2, and so on, as well as employing downloadable resource management means B1 for maintaining resource management information that describes those resources F1, F2, and so on.

The other server computers provide the users on the network N1 with various application services, being equipped with means for helping download resources and for managing some information on linkage between the resources and applications. For example, the server computers A2 and A3 respectively have download agent means E1 and E2 for supporting download operations, as well as employing resource linkage management means C1 and C2 for managing resource linkage information.

On the other hand, the terminal computers T1, T2, and so on are equipped with local resource information management means H1, H2, and so on, for managing local resource information concerning the resources that they own.

As described above, all the downloadable resources are collected in the server computer A1, which configuration eliminates the need for the other computers to keep the same resources privately. This centralized resource management allows the system operator to concentrate his effort upon management of the server computer A1, thus reducing the burden of resource management.

In the system illustrated above, the server computer A1 is dedicated to the management of downloadable resources. The server computer A1, however, can also be configured, as an alternate structure, in such a way that it will provide various applications to the users just as the server computers A2 and A3 do. In that case, the server computer A1 will also have a download agent and resource linkage management means in addition to the downloadable resource management means B1 and downloadable resource storage means D1.

Next, the operation of the remote resource management system according to the present invention will be described by way of example. Assume here that a user has selected one of the applications supported by the server computer A2 or has issued a request to load some data necessary for the application. In response to the user's selection or request, the server computer A2 determines the most suitable resource for the application by consulting the resource linkage management means C1. Here, the server computer A2 locates, for example, the resource F1 and finds that the server computer A1 is the right source. The resource linkage management means C1 has a database in which the names and locations of downloadable resources are registered. With this database, the resource linkage management means C1 retrieves the name and location (or address) of the resource that most fits with the application selected or requested by the user. This information is referred to as "resource address information," since it is used to locate a specific resource file.

Subsequently, the server computer A2 transmits to the terminal computer T1 a copy of the download agent means E1 along with the retrieved resource address information indicating that the downloadable resource F1 in the server computer A1 is required.

Upon arrival at the terminal computer T1, the download agent means E1 automatically starts running and compares the resource address information provided by the server computer A2 with the local resource information stored in the local resource information management means H1 of the terminal computer T1. If it is found, as a result of the comparison, that the required resource already exists in the terminal computer T1, there will be no need to download the resource from the server computer A1 again. The download agent means E1 then stops execution and unloads itself, thereby allowing the terminal computer T1 to activate the downloaded application or return to the application which was running until the download agent means E1 interrupted it.

In the case that the required resource does not exist in the terminal computer T1, there will arise a need to download the resource from the server computer A1. If this is the case, the download agent means E1 sends the resource address information to the server computer A1 to request downloading. By consulting the downloadable resource management means B1, the server computer A1 locates a resource file corresponding to the received resource address information and retrieves the downloadable resource F1 from the downloadable resource storage means D1. The server computer A1 then delivers the retrieved downloadable resource F1 to the terminal computer T1, thereby downloading a resource file over the network N1.

The downloaded resource file is then applied to the system environment of the terminal computer T1 at some different installation levels, according to the installation mode of each resource. More specifically, the downloaded resource will be installed into the terminal computer in either way of: (1) simply saving the downloaded resource file into a local storage unit of the terminal computer, (2) using an installer program to set up the resource, or (3) requesting the operating system to link the resource to the terminal computer system.

When the downloaded resource is installed to the terminal computer T1, the local resource information in the local resource information management means H1 will also be updated for this new entry. Upon completion of the resource installation to the terminal computer T1, the download agent means E1 is unloaded, thereby allowing the terminal computer T1 to activate the downloaded application or return to the application which was running until the download agent means E1 interrupted it.

When necessary, the main power of the terminal computer T1 will be cycled after the installation process is finished. In that case, the application selected or requested by the user will not immediately be executed but once canceled. The download agent means E1 is also unloaded by turning off the main power, and thus the user has to select or designate the same application again when the terminal computer T1 is powered up.

FIG. 1 shows a similar situation where download agent means E2 was duplicated in the terminal computer T2, and this download agent means E2 has downloaded a downloadable resource F2 from the downloadable resource storage means D1.

As an alternative arrangement, the system can be configured so that the terminal computers T1 and T2, upon reception of the download agent means E1 and E2 from the server computer A2, will upload a copy of the received download agent means E1 and E2 to the server computer A1. In that case, the two download agent means E1 and E2, one in the server computer A1 and the other in terminal computers T1 and T2, will communicate with each other to download necessary resources from downloadable resource storage means D1 to the terminal computers T1 and T2.

The above-described structural arrangement makes it possible to download, upon request from users, only a minimum number of necessary resources for the requested application. The terminal computers are free from unnecessarily extensive consumption of hardware resources such as storage capacity. Consequently, the users can enhance the hardware of their computers at the appropriate times, according to their individual needs and plans.

Furthermore, the above-described structural arrangement according to the present invention will prevent any version-related troubles from happening when users attempt to run their applications. More specifically, the resource linkage management means and downloadable resource management means hold the latest information on what resources are most suitable for each application. Even if some change happens to a certain resource that is necessary for some applications, the most suitable version of the resource is automatically downloaded to the terminal computers when the users start the applications. Therefore, the users are free from potential problems related to the use of old or inappropriate resource versions.

Still another advantage of the present invention is easy maintenance and management of the downloadable resources. All downloadable resources are stored only in the downloadable resource storage means D1 of the server computer A1 in charge of management of downloadable resources. That is, the resources are controlled under the unified management by the server computer A1 to facilitate the maintenance and management of the downloadable resources.

Figure 2:
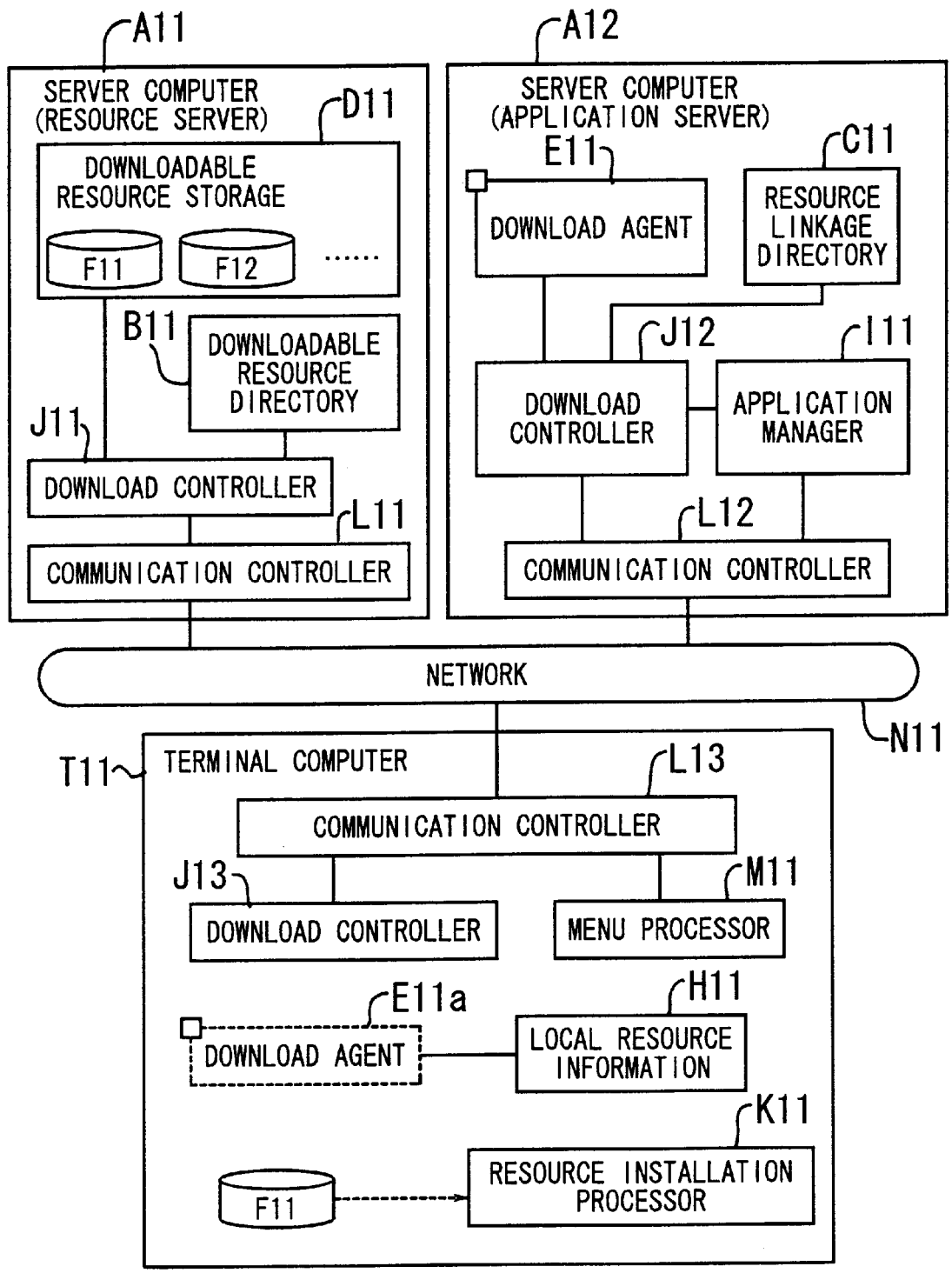
FIG. 2 is a diagram showing a specific example of the remote resource management system according to the present invention.

Referring now to FIG. 2, the following description will present a more specific distributed system in which the present invention is implemented.

FIG. 2 illustrates a remote resource management system in a distributed computing system which is configured according to the present invention. For simplicity of explanation, the illustrated system is organized by only three computers: server computers A11 and A12 and a terminal computer T11. The server computer A11 solely manages the downloadable resources, while the other server computer A12 offers application services to the user, or the terminal computer T11. Those three computers are interconnected by a network N11.

To distinguish the two server computers in the present specification, the server computer A11 managing the downloadable resources will be called "resource server," and the other server computer A12 providing application services will be called "application server."

The resource server A11 comprises downloadable resource storage D11, downloadable resource directory B11, download controller J11, and communication controller L11. The downloadable resource storage D11 stores two files that contain downloadable resources F11 and F12, which include programs and data shared by the computers on the network N11. The downloadable resource directory B11 maintains some information for managing these downloadable resources. This resource management information includes the version number of each resource, names of source directories and source files, names of destination directories and destination files, installation modes, and other information. The download controller J11 executes a server-side download process in the resource server A11. The communication controller L11, connected to the network N11, supports communications with other computers.

The application server A12 has a download agent E11, a resource linkage directory C11, an application manager I11, a download controller J12, and a communication controller L12. When a terminal computer selects one of the applications provided by the application server A12, a copy of the download agent E11 is delivered to that terminal computer and executes a downloading service for the terminal computer to fetch some appropriate resources corresponding to the selected application. The resource linkage directory C11 manages information about downloadable resources to be used in each application, as well as maintaining information regarding which computer is managing those downloadable resources.

Upon receipt of information about the application selected by the terminal computer T11, the application manager I11 notifies the download controller J12 of the selected application. Out of the resource linkage directory C11, the download controller J12 retrieves resource address information necessary for the application notified by the application manager I11. The download controller J12 then sends a copy of the download agent E11, along with the retrieved resource address information, to the terminal computer T11 which selected the application. Here, the communication controller L12 is used by the download controller J12 to communicate with the other computers via the network N11.

The terminal computer T11 employs a local resource information H11, a menu processor M11, a download controller J13, a communication controller L13, and a resource installation processor K11. The local resource information H11 in the terminal computer T11 manages information concerning such resources that are already installed therein, namely, the local resources. The menu processor M11 provides a menu screen for the user to select an application. This menu screen appears first, each time the terminal computer T11 is powered up. The download controller J13 executes a download process, under the control of the download agent, where the communication controller L13 is used to communicate with the other computers over the network N11. The resource installation processor K11 executes an installation process to set up a newly downloaded resource in this terminal computer T11.

In the remote resource management system of the present invention, its operation is initiated by a terminal computer. First, the user of the terminal computer T11 selects his/her desired application by specifying one of the items displayed on a menu screen provided by the menu processor M11. When the selection is made, the terminal computer T11 establishes a connection over the network N11 to reach the application server A12 which offers the selected application. In the application server A12, the application manager I11 receives a message indicating the user's request for the selected application, and sends the name of the application to the download controller J12. In response to this notification of the application name, the download controller J12 searches the resource linkage directory C11 to obtain resource address information corresponding to the resources that are necessary for the selected application. Subsequent to the search, a network connection between the download controller J12 in the application server A12 and the download controller J13 in the terminal computer T11 is established by the two communication controllers L12 and L13. With this network connection, the download agent E11 and the retrieved resource address information are downloaded together from the application server A12 to the terminal computer T11.

The download agent E11$a$, a downloaded copy of the download agent E11, consults the local resource information H11 that stores information about the resources already installed in the terminal computer T11. Comparing the resource address information with the contents of the local resource information H11, the download agent E11$a$ examines whether the necessary resource file exists in local storage of the terminal computer T11.

If the relevant resource is found in the terminal computer T11, there is no need to reload the same resource from the resource server A11. Thus the download agent E11$a$ in the terminal computer T11 notifies the download controller J13 in the terminal computer T11 of the completion of the download process. The download controller J13 then posts the termination of the download process to the download controller J12 in the application server A12, thereby clearing the network connection between the two download controllers J12 and J13. The download controller J12 in the application server A12 informs the application manager I11 of the termination of the download process. The application manager I11 then decides whether to continue the current application.

When it is found, in the previous question about availability of necessary resources, that relevant resource files are not ready in the local storage of the terminal computer T11, the download agent E11$a$ then sets up a network connection to initiate communications with the resource server A11, based on the resource address information. As a result, a connection path between the download controller J11 in the resource server A11 and the download controller J13 in the terminal computer T11 is established by using the function of the two download controllers J11 and J13. Through this established connection path, the download agent E11$a$ sends a download request message to the download controller J11 in the resource server A11.

Based on the contents of the download request message, the download controller J11 in the resource server A11 searches the downloadable resource directory B11, and identifies the relevant files which should be downloaded to the requesting terminal computer. The download controller J11 then retrieves those files from the downloadable resource storage D11. Assume here that the download controller J11 identified the downloadable resource file F11 as the relevant resource file for the request. The download controller J11 transfers to the terminal computer T11 the downloadable resource file F11 along with some setup control information such as the destination of the file.

The terminal computer T11 receives the resource file F11 along with the setup control information from the resource server A11 and, when the file transfer is completed, it clears the connection path between the two download controller J11 and J13. The download agent E11$a$ in the terminal computer T11 then examines whether an automatic installation mode is specified in the setup control information provided by the resource server A11. If an automatic installation mode is specified, then the download agent E11$a$ executes installation of the received resource file F11 by passing it to the resource installation processor K11 or by working together with the operating system. When a manual installation mode is specified in the setup control information, the user is responsible to change the system configuration of the terminal computer T11 to set up an operating environment for the downloaded resource.

When the automatic installation is finished, the download agent E11a in the terminal computer T11 reports the completion of the download process to the download controller J13, and then unloads itself. The download controller J13 in the terminal computer T11 reports the completion of downloading to the download controller J12 in the application server A12 and closes the connection between the download controllers J12 and J13. The download controller J12 in the application server A12 notifies the application manager I11 of the completion of downloading. The application manager I11 decides whether to continue the present application.

When the installation is finished, the terminal computer T11 decides whether the main power of the computer should be cycled, to allow the installed new resource to take effect. This decision is made by the download controller J13, based on the setup control information. If the download controller J13 determined that the power should be cycled, the terminal computer T11 automatically turns off the main power of itself and then turns it on again, thereby enabling the new operating environment.

The following description will now present a specific example of the resource linkage directory C11 in the application server A12, the downloadable resource directory B11 in the resource server A11, and the local resource information H11 in the terminal computer T11.

FIGS. 3(A) and 3(B) illustrate the resource linkage directory C11 and the downloadable resource directory B11. The resource linkage directory C11 illustrated in FIG. 3(A) resides in the application server A12, which supervises applications, and it is used to manage the resource address information that indicates downloadable resources to be used in each application as well as teaching which computer holds those downloadable resources.

FIG. 3(A) depicts such resource address information in table form. The first column of the table shows the names of applications, while the next two columns show the names of resources and their respective version numbers suitable for the applications listed in the first column. In the fourth column of the table, the names of the computers that manage the resources. Although the entries seen in the third column are simple symbolic names such as "A11" for explanatory purposes, full communications addresses of the server computers are actually registered in this column.

FIG. 3(B) shows an example of the downloadable resource directory B11, which resides in the resource server A11 managing all downloadable resources. FIG. 3(B) represents this directory in the form of a table having two major parts; one is a list of downloadable resources and the other contains various information pertaining to the destinations of each downloadable resource. The first part of the downloadable resource directory B11, or the resource file information, consists of:

(a) Resource names.
(b) Version numbers.
(c) File names.

Although being simplified in FIG. 3(B), the file names actually include path information that allows the download controller J11 to follow through the hierarchical directory structure to locate the resources.

On the other hand, the second part of the directory information, or the resource destination information, includes:

(d) File names used in destination sites (i.e., in terminal computers).

(e) File types (user file or system file).
(f) Installation modes (manual or automatic).
(g) Necessity of cycling the main power after installation.

There are two cases in the automatic installation mode. In one case, resources will be linked to the operating system of a target computer, which will be referred to as "system-linked installation." In the other case, the resource installation manager K11 is called up for installing resources. This will be referred to as "installer-based installation." The former system-linked installation generally requires the main power of a target computer to be cycled, because the system environment is altered during the resource installation process and thus the system must be restarted.

The above-described two directories are separately created by different system operators. That is, one operator managing downloadable resources creates the resource linkage directory C11, while another operator managing applications produces the downloadable resource directory B11. But, these two directories are linked to each other, when they are created, with a common key term such as the resource names. In the present example shown in FIGS. 3(A) and 3(B), the combination of the resource names and version numbers provides the association between the resource linkage directory C11 and downloadable resource directory B11.

Figure 4:
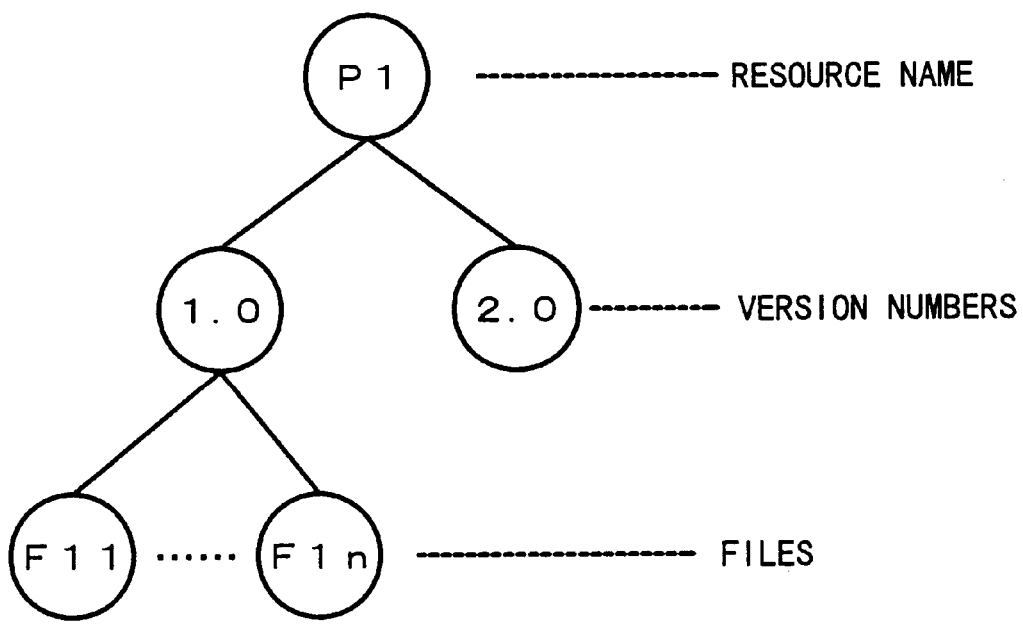
FIG. 4(A) is a diagram showing an example of local resource information represented in list form.
FIG. 4(B) is a diagram showing an example of tree-structured data in a local resource information.

FIGS. 4(A) and (B) explain about the local resource information in a terminal computer by way of example. FIG. 4(A) shows a list of local resources registered in the local resource information H11. The entry for a downloadable resource consists of a resource name, version number, and file name.

The information stored in the local resource information H11 can also be graphically represented in the form of a tree structure, as shown in FIG. 4(B), by using a file management function provided by the downloadable resource storage. In this hierarchical representation, each resource name, version number, or file name is expressed as a node located on a tree. FIG. 4(B) shows that two version nodes 1.0 and 2.0 are placed under the resource node P1, and files nodes F11–F1n are linked to the version node 1.0. This method requires no special technique for management of the local resources, but it can be easily achieved by making directories in a hard disk according to the above-described hierarchical structure. The download agent can reach the resources by simply following this tree structure.

Figure 5:
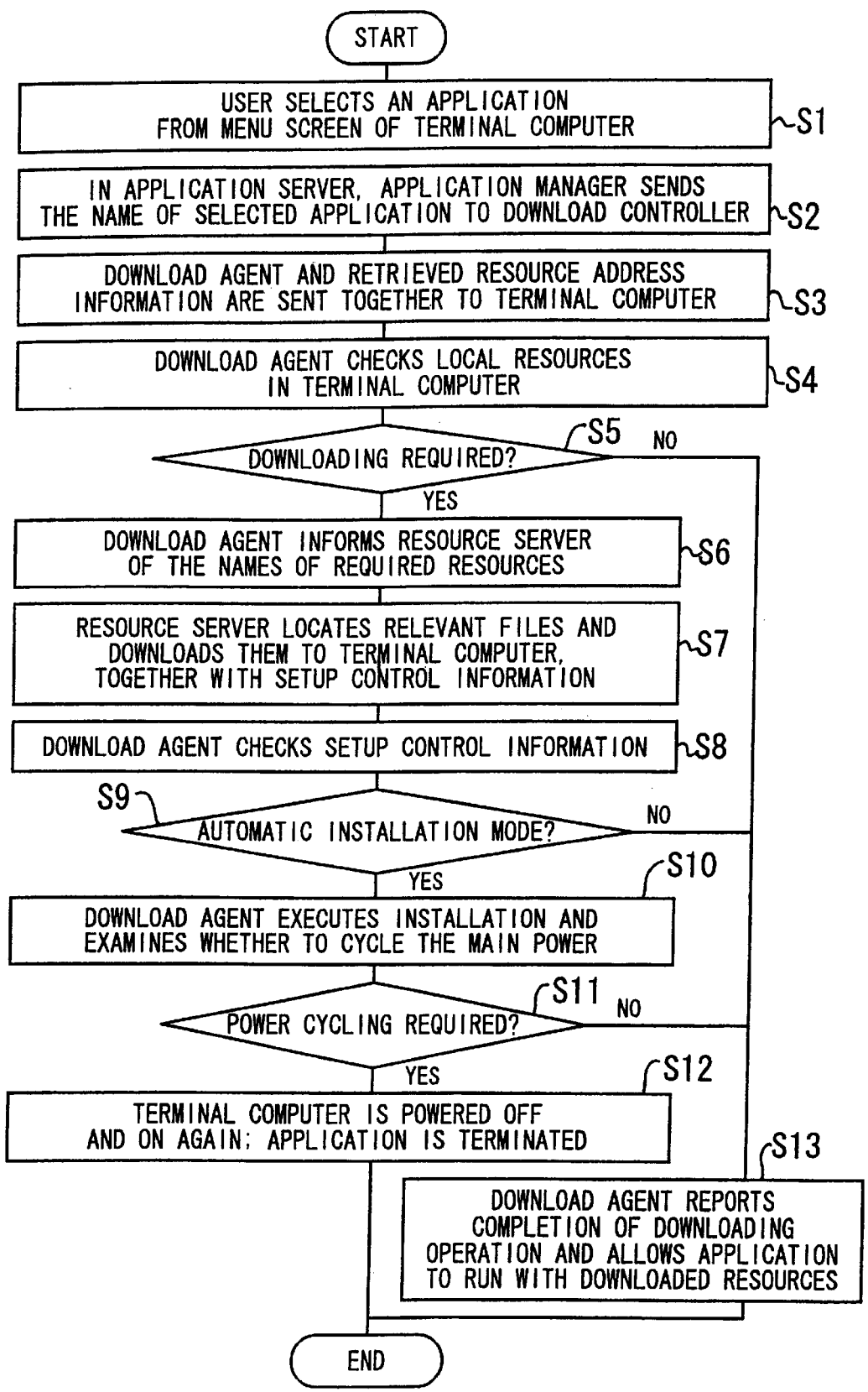
FIG. 5 is a flowchart showing a download procedure.

Referring now to the flowchart of FIG. 5, the following will show a procedure of downloading resources in the remote resource management system shown in FIG. 2.

This flowchart comprises thirteen steps S1 to S13, where the numerals following the letter "S" indicate the step numbers.

[S1] When a terminal computer is powered up, an application menu screen appears by default on the terminal computer screen. From the menu displayed on the screen, the user selects an application that he/she desires.

[S2] The terminal computer is connected to a server computer that provides the selected application, thereby triggering the application manager in the server computer. The application manager identifies what kind of application was selected at the terminal computer, and notifies the download controller of the name of the selected application (e.g., application name "X1").

[S3] From the resource linkage directory, the download controller retrieves resource address information on the resources that will be used in the application. The retrieved information (e.g., "resource name P1, version 1.0 or later") is attached to the download agent, and they are sent together to the terminal computer.

[S4] The download agent, now running in the terminal computer, refers to the local resource information to compare the resource address information with each entry of the local resource information, thereby examining whether the required resources are already installed in the terminal computer.

[S5] Here, it is examined whether downloading is necessary. If the required resources are not installed yet, the process advances to step S6. If they exist in the local storage of the terminal computer, there is no need to download them again. Then the process advances to step S13 for a post-download process.

[S6] In the case that downloading is necessary, the download agent finds a relevant server computer that manages the required downloadable resource, referring to the resource address information. The download agent then makes a connection to that server computer to issue a download request message, thereby providing the download controller in the server computer with the names of the required resources and other information.

[S7] The download controller in the server computer that holds the downloadable resources consults the downloadable resource directory to locate downloadable resource files that correspond to the download request message. For example, when a resource name P1 is designated in the download request message, the download controller locates a resource file F11 corresponding to the resource name P1. The download controller then downloads the resource files to the requesting terminal computer, along with some setup control information for the resources.

[S8] When the resource files are successfully downloaded to the terminal computer, the download agent in the terminal computer checks the setup control information that has arrived together with the resource files.

[S9] It is examined whether an automatic installation mode is specified in the setup control information. If an automatic installation mode is specified, then the process advances to step S10. If a manual installation mode is specified, the process branches to step S13 to terminate this downloading process without installing the downloaded resources.

[S10] The download agent in the terminal computer executes installation of the received resource files according to the installation mode specified in the setup control information. That is, the download agent installs the received resource files by itself, or calls up the resource installation processor, thereby allowing the resources to be set up in the system of the terminal computer or to be stored as part of the user files. Since the installation of new resources may affect the system environment, the download controller examines the setup control information to determine whether the main power of the terminal computer should be cycled.

[S11] It is determined whether the main power should be cycled. If the power should be cycled, the process advances to step S12. Otherwise, the process branches to step S13.

[S12] Since the downloaded resources turned out to be such resources that require the power to be cycled so that the new setup will take effect, the terminal computer is powered off and on again. With the removal of the main power, the application that has been running is accordingly terminated. When powered again, the terminal computer will automatically display the menu screen to allow the user to select the same application again. Upon selection of the application, the terminal computer follows the same procedure from step S1 to step S5. Since all the necessary resources are now ready in the terminal computer, the process branches from step S5 to step S13, thus enabling the application to start without downloading.

[S13] The download agent in the terminal computer reports the completion of downloading to the download controller in the server computer providing the application. The download agent in the terminal computer then unloads itself. The download controller in the server computer notifies the application manager of the completion of downloading. The application at the terminal computer is now ready to run with the new resources suitable for the application.

Figure 6:
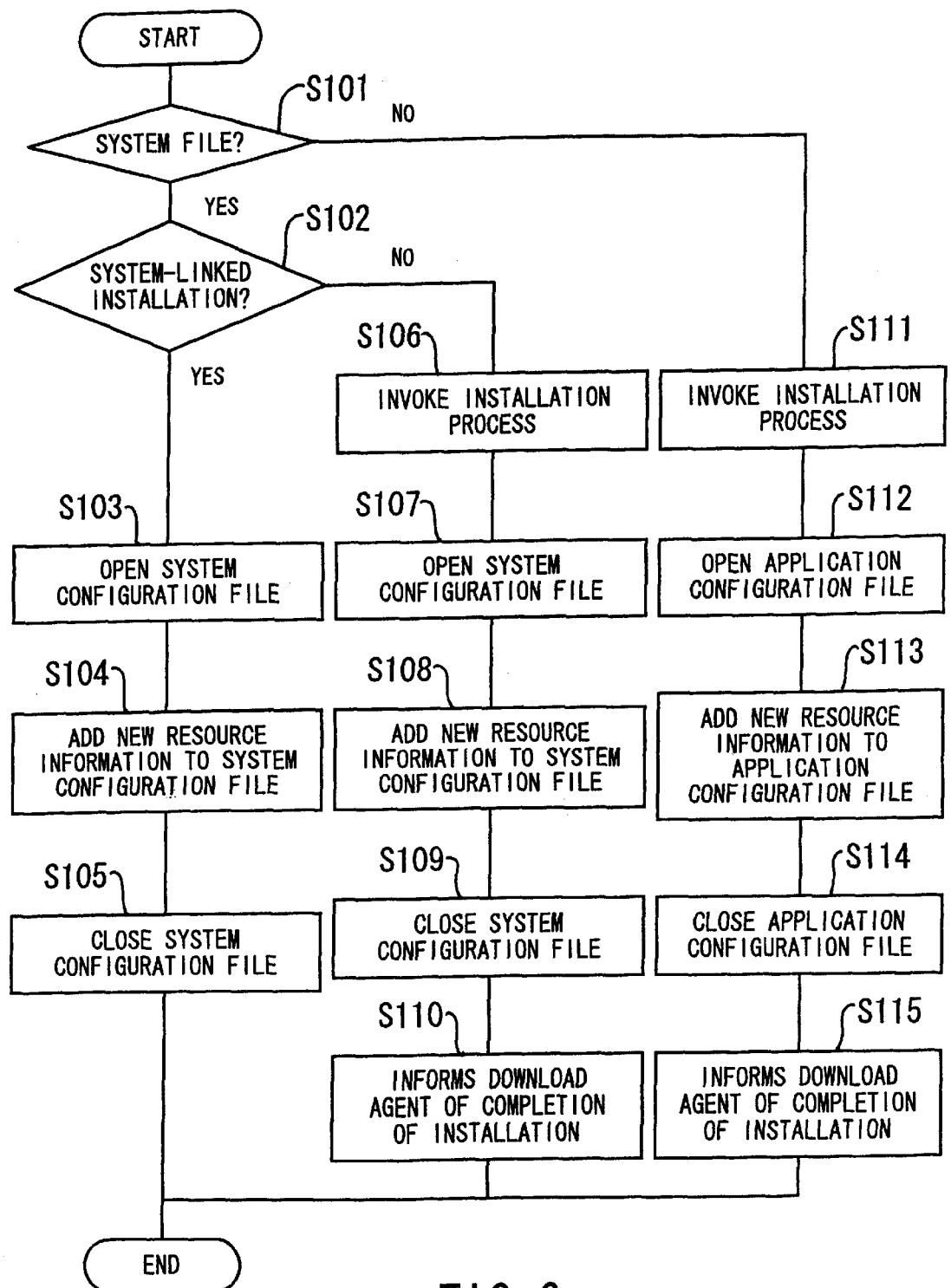
FIG. 6 is a flowchart showing a detailed procedure of installation.

Referring now to FIG. 6, the following will present the details of the resource installation process which is performed at the above-described step S10.

[S101] Based on the setup control information attached to the downloaded resource files, the download agent in the terminal computer examines whether each resource file has a system file property. In other words, it is tested whether the downloaded resource file should be installed as a system file or as a user file. When the resource file is to be a system file, the process advances to the next step S102. When the resource file is to be a user file, the process branches to step S111.

[S102] For system file installation, it is then examined whether a system-linked installation is designated. When the system-linked installation is designated, the process advances to the next step S103. Otherwise, the process branches to step S106.

[S103] Since it is found that the system-linked installation is designated, the download agent opens the system configuration file by itself.

[S104] To make the downloaded resource linked to the system, the download agent adds some information about the downloaded resource to the system configuration file.

[S105] The download agent closes the updated system configuration file and ends the installation.

[S106] The download agent invokes a process, as part of the resource installation processor, that undertakes setup procedures related to the system files, which process will hereafter be referred to as "installation process."

[S107] The installation process invoked by the download agent opens the system configuration file.

[S108] To make the downloaded resource linked to the system, the installation process adds necessary information pertaining to the downloaded resource to the system configuration file.

[S109] The installation process closes the updated system configuration file.

[S110] The installation process informs the download agent of the completion of the installation and then terminates itself.

[S111] When it is found in step S101 that the downloaded resource file is not to be a system file, the download agent initiates another kind of installation process, as part of the resource installation processor, to set up the downloaded resource file as a user file.

[S112] The installation process opens the application configuration file.

[S113] The installation process adds necessary information on the downloaded resource to the application configuration file.

[S114] The installation process closes the application configuration file.

[S115] The installation process notifies the download agent of the completion of resource installation and then terminates itself.

Figure 7:
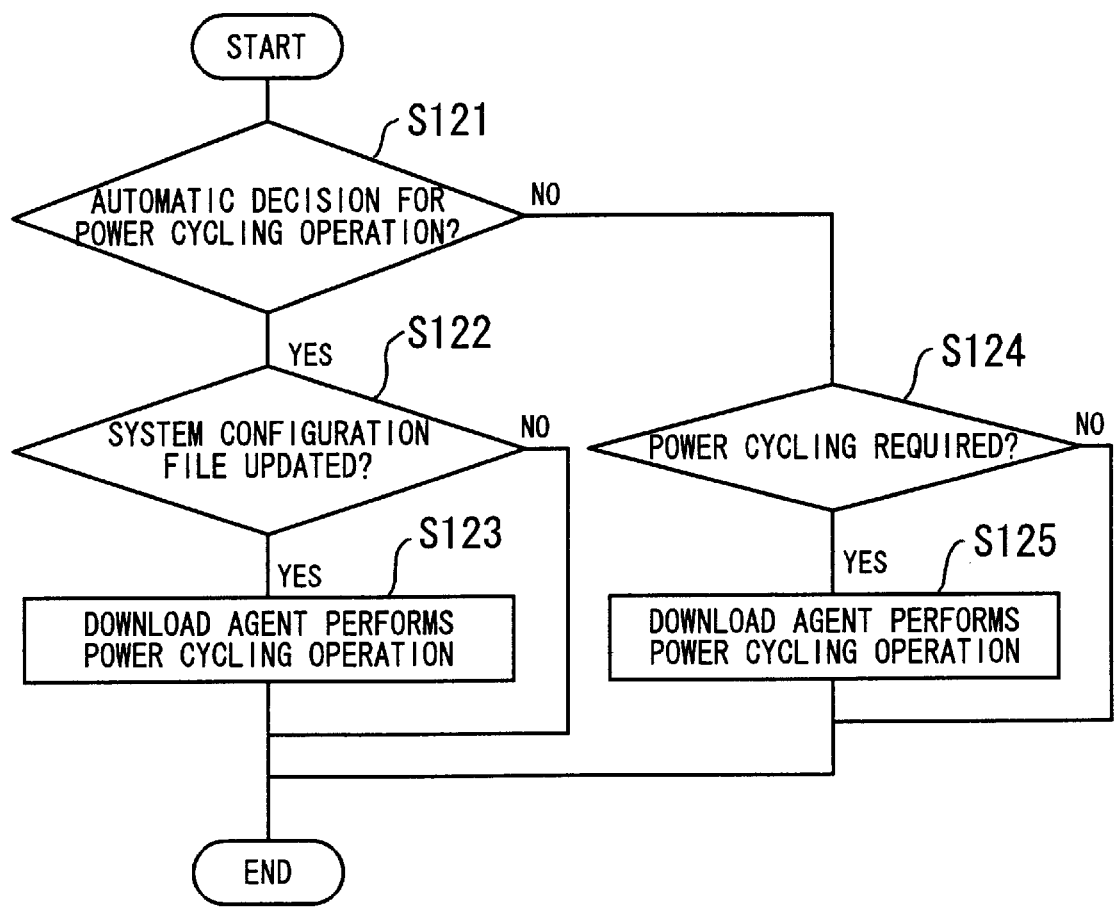
FIG. 7 is a flowchart showing a detailed procedure of cycling the power.

Referring now to FIG. 7, the following description will explain a detailed procedure of the aforementioned main power cycling in step S12 of the flowchart shown in FIG. 5.

[S121] Based on the setup control information downloaded along with the resource files, the download agent learns how to determine the necessity of power cycling operation. Here, it is first determined whether an automatic decision for the power cycling operation is requested. If the setup control information specifies a "system-linked" power cycling, the process will advance to step S122. Otherwise, the process branches to step S124.

[S122] It is tested whether the installation process updated the system configuration file or application configuration file in the previous session performed in the automatic installation mode. If it was the system configuration file, the process advances to step S123. If it was a mere application configuration file, the newly installed resource will not affect the system environment, and therefore, the process is terminated.

[S123] The download agent executes the main power cycling operation, using a power cycling command that initiates automatic shutdown and startup.

[S124] In the case that the automatic decision is not specified in the setup control information, the decision of the necessity of power cycling operation is explicitly designated in the downloadable resource directory. Referring to the relevant part of the downloadable resource directory, the download agent determines whether a power cycling is required. If the downloadable resource directory indicates that a power cycling is "required," the process goes to step S125. If it indicates "not-required," the process finishes without cycling the main power.

[S125] The download agent executes the main power cycling operation, using a power cycling command that initiates automatic shutdown and startup.

To explain the embodiment in the present invention in more detail, the following description will show a specific system where a movie player application is provided.

Figure 8:
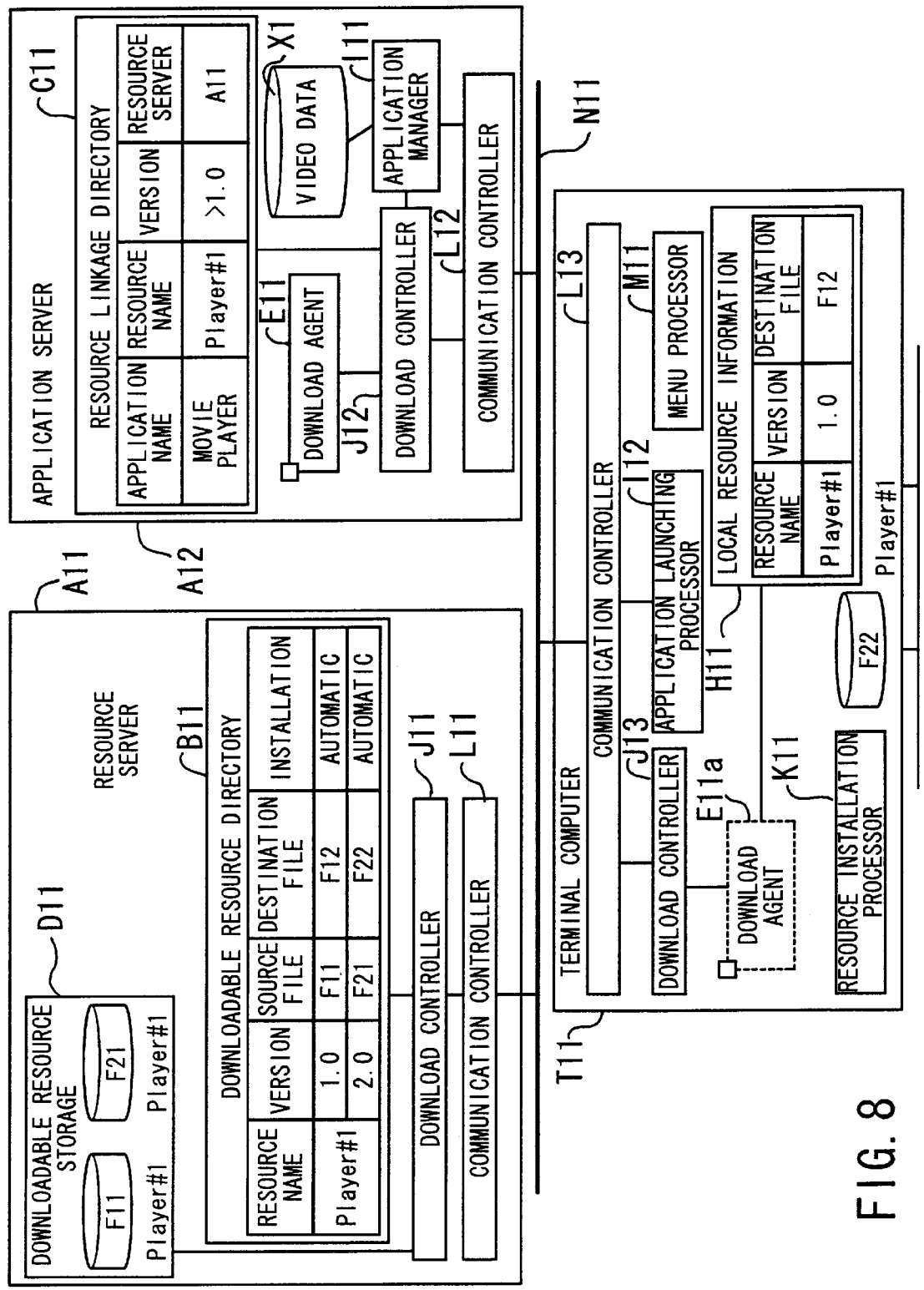
FIG. 8 is a system configuration diagram for explaining a download process to be executed when a movie player application is selected.

FIG. 8 is a block diagram of a distributed system prepared for showing a download process that is performed when a user selected a movie player application. Since the system structure shown in FIG. 8 is basically the same as that in FIG. 2, the following description will focus on their distinctive points while affixing like reference numerals to like elements.

In this example case, the downloadable resource storage D11 in the resource server A11 stores two downloadable resources F11 and F21 corresponding to two movie player applications having the same title "Player #1" but with different version numbers. Accordingly, the downloadable resource directory B11 holds resource management information for these two downloadable resources F11 and F21.

The resource linkage directory C11 in the application server A12 has resource address information describing the name of a resource required in the movie player application and the location of that resource. The application server A12 holds video data X1 as a source data for the movie player application (Player #1).

The local resource information H11 in the terminal computer T11 includes information on the resources installed therein. The local resource information H11 shown in FIG. 8 indicates that a file F12 for a movie player application titled "Player #1" with version number 1.0 is stored in the terminal computer T11.

The terminal computer T11 employs an application launching processor I12. This application launching processor I12 collects information on various applications provided by the server computers (including those not shown in FIG. 8) on the network N11 and rearranges the collected information to supply menu data to the menu processor M11, thereby offering to the user an application menu screen. The application launching processor I12 also serves as a launcher that calls up an application when it is selected by the user through the application menu screen. When a resource relevant to the selected application is downloaded, the application launching processor I12 directs the downloaded resource (i.e., application program) to execute the selected application.

Figure 9:
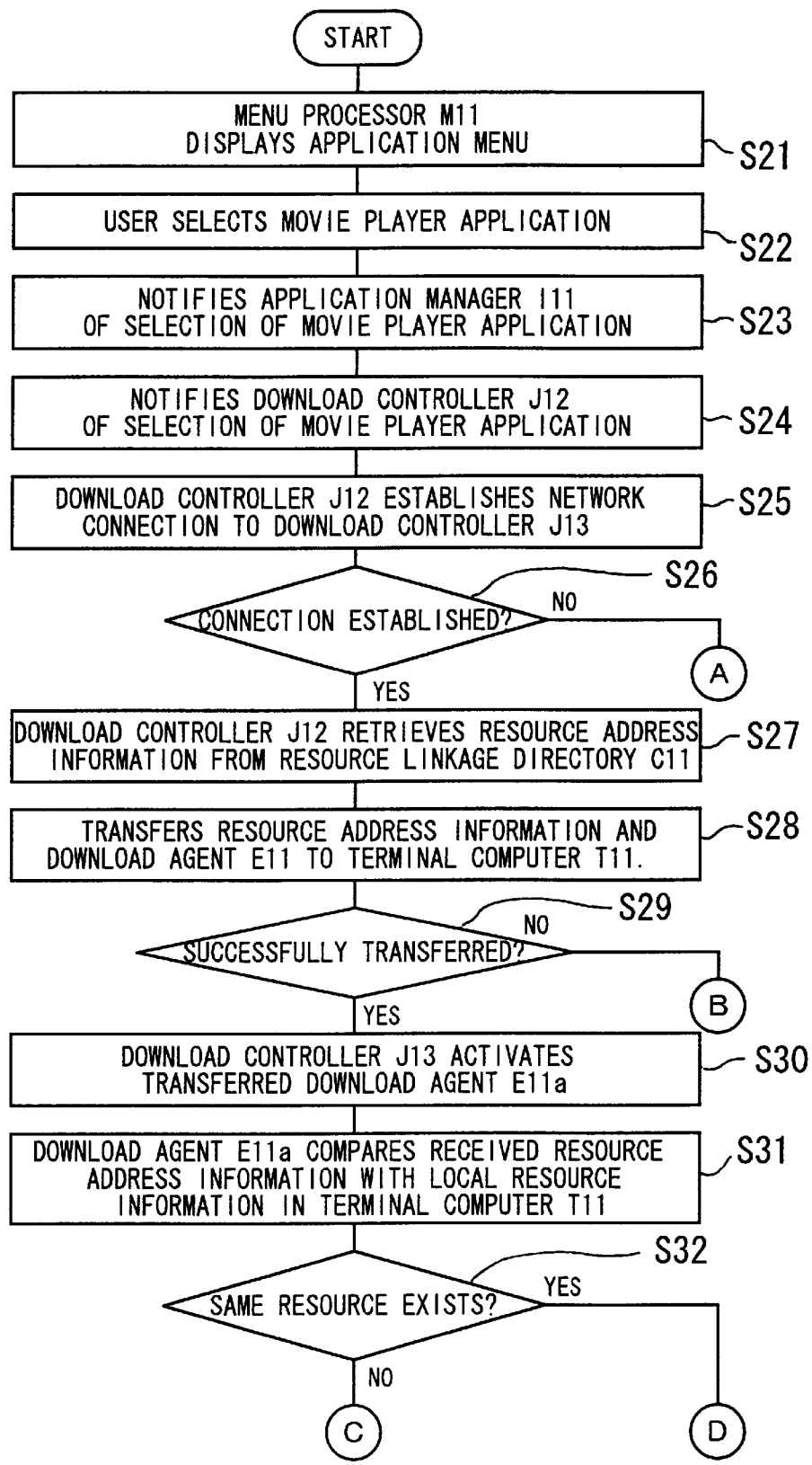
FIGS. 9, 10, and 11 are the first, second, and third parts of a flowchart showing a procedure executed when a movie player application is selected.
Figure 10:
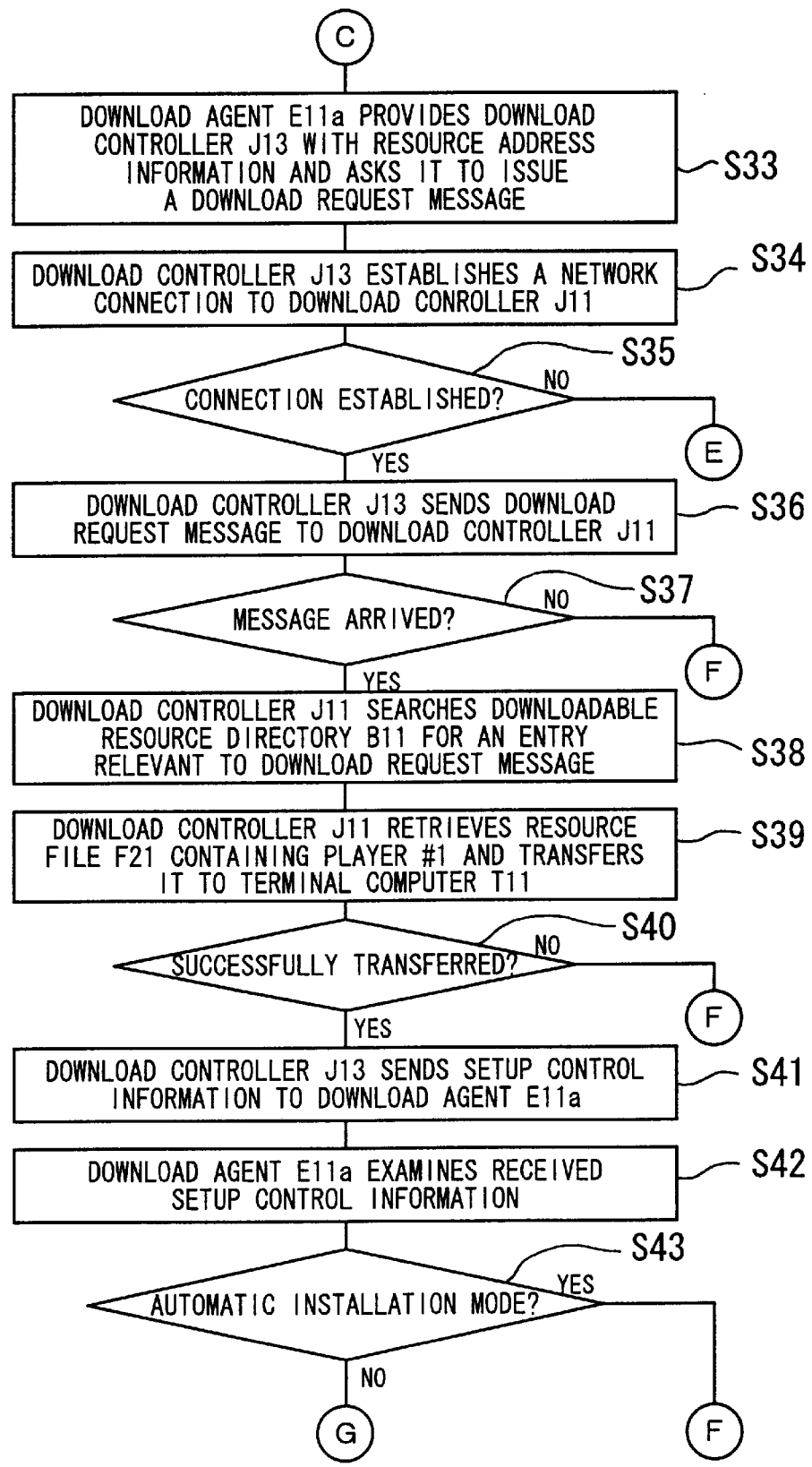
Figure 11:
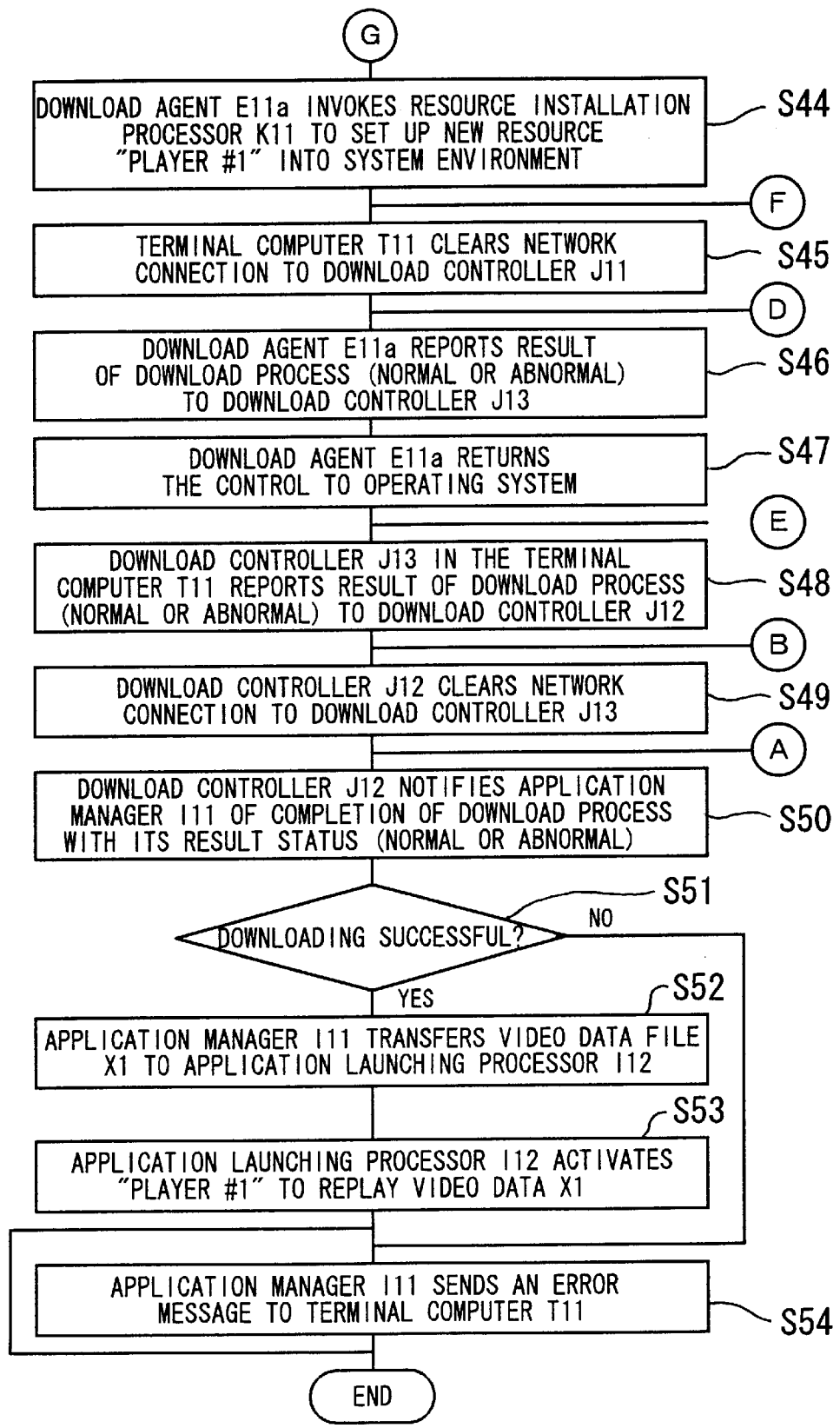
Figure 12:
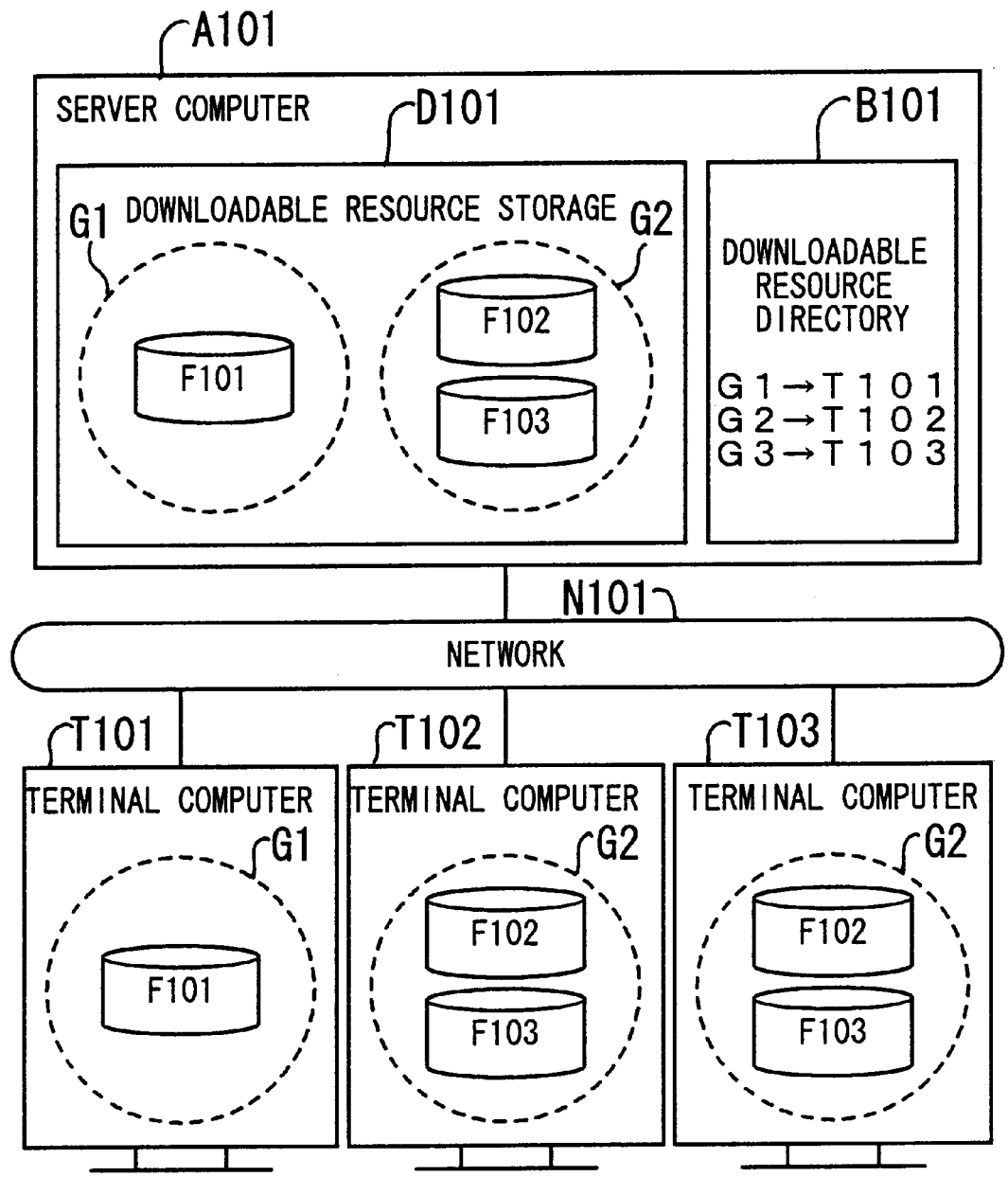
FIG. 12 is a diagram showing an example of a conventional system for managing remote software resources.
Figure 13:
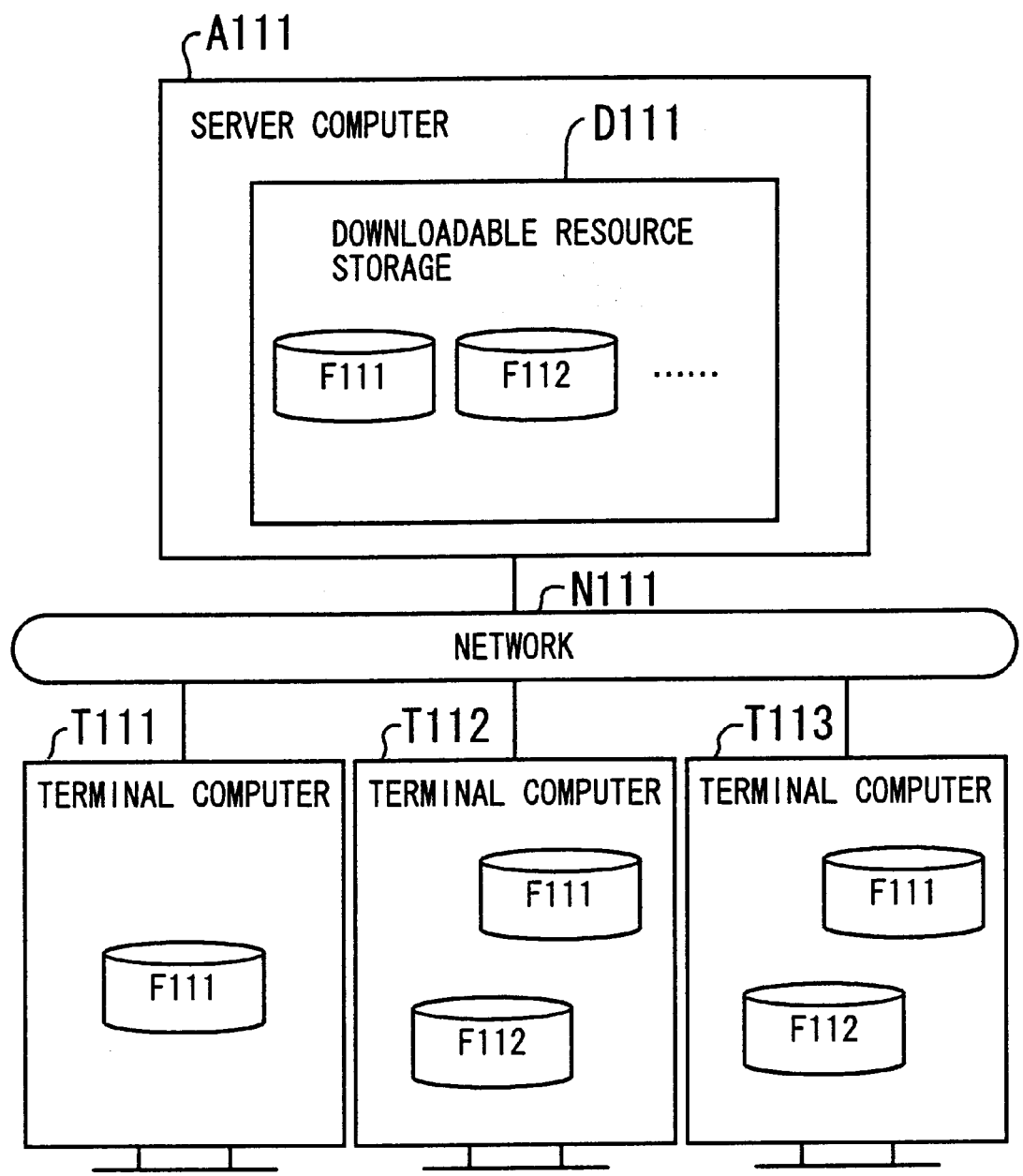
FIG. 13 is a diagram showing another example of a conventional system for managing remote software resources.

Referring now to several flowcharts in FIGS. 9–11, the following description will explain a download process initiated when a movie player application is selected. The process comprises steps S21 to S54.

[S21] First, the application launching processor I12 in the terminal computer T11 directs the menu processor M11 to display an application menu screen to prompt the user to select an application.

[S22] The application menu contains some items with a thumbnail image, allowing the user to see a corresponding movie by simply clicking the image. Here, the user selects one image from among those presented in the application menu, thereby calling a movie player application to replay movie data X1.

[S23] The application launching processor I12 notifies the application manager I11 in the application server A12 that the user selected a movie player application to see the video data X1.

[S24] The application manager I11 in the application server A12 notifies the download controller J12 of the selection of a movie player application.

[S25] The download controller J12 in the application server A12 then establishes a network connection to the download controller J13 in the terminal computer T11.

[S26] It is tested whether the connection is established. If the connection is successfully established, the process advances to step S27. If the connection cannot be established, the process jumps to step 50.

[S27] Upon establishment of the network connection between the two download controllers J12 and J13, the download controller J12 in the application server A12 retrieves resource address information from the resource linkage directory C11. More specifically, the download controller J12 searches the resource linkage directory C11 using the application name "movie player" as key information, and it yields information regarding the "movie player" application. This information indicates that the resource is named "Player #1," the version must be "later than 1.0," and the resource is stored in the "resource server A11."

[S28] The download controller J12 in the application server A12 transfers the resource address information and the download agent program E11 to the terminal computer T11.

[S29] It is examined whether the transfer of the resource address information and the download agent program E11 has successfully finished. If the data transfer has successfully finished, the process advances to step S30. Otherwise, the process jumps to step S49.

[S30] After completion of the data transfer, the download controller J13 in the terminal computer T11 activates the transferred download agent E11a.

[S31] The download agent E11a in the terminal computer T11 compares the received resource address information with the local resource information H11 registered in the terminal computer T11.

[S32] In this comparison, it is examined whether or not the local resource information H11 contains an entry with the same resource name and version number as those in the resource address information. If such an entry is found in the local resource information H11, the process branches to step S46. Otherwise, the process advances to step S33. In the present case shown in FIG. 8, the resource address information indicates that the resource name is "Player #1," the version must be "later than 1.0," and the resource is stored in the "resource server A11." On the other hand, a like entry found in the local resource information H11 shows that the terminal computer T11 has a resource file F12 titled "Player #1" with version number "1.0". The download agent E11a accordingly notices that the existing resource is too old to play the video data X1, and learns that an appropriate version of "Player #1" has to be newly downloaded thereto.

[S33] Providing the details of the resource address information (i.e., Player #1 with version number later than 1.0 in the resource server A11), the download agent E11a in the terminal computer T11 asks the download controller J13 to issue a download request message to the relevant server computer.

[S34] The download controller J13 in the terminal computer T11 establishes a connection to the download controller J11 in the resource server A11.

[S35] It is examined whether the connection has been successfully established. If the connection is successfully established, the process proceeds to step S36. If failed, the process jumps to step S48.

[S36] Since the connection is successfully established, the download controller J13 in the terminal computer T11 sends a download request message to the download controller J11 in the resource server A11. The download request message specifies the resource Player #1 whose version number is later than 1.0.

[S37] It is examined whether the download request message has successfully arrived at the resource server A11. If the message arrived at the resource server A11, the process proceeds to step S38. Otherwise, the process jumps to step S45.

[S38] Upon receipt of the download request message, the download controller J11 in the resource server A11 searches the downloadable resource directory B11 for an entry that is relevant to the contents of the message (i.e., Player #1, version >1.0). In the present example shown in FIG. 8, the downloadable resource directory B11 has an entry for the resource Player #1 with version number 2.0. This resource is stored as a resource file F21 in the downloadable resource storage D11. The downloadable resource directory B11 also indicates that the resource Player #1 will be set up, as a renamed file F22, in automatic installation mode at a destination site (i.e., a terminal computer). This information concerning the resource installation is referred to as the setup control information.

[S39] The download controller J11 in the resource server A11 retrieves the resource file F21 containing the resource Player #1 from the downloadable resource storage D11, and transfers the retrieved resource file F21 to the terminal computer T11, along with the setup control information obtained in step S38. The terminal computer T11 receives the resource file F21 and saves it into the local storage, renaming the file as F22 according to the received setup control information.

[S40] It is examined whether the file transfer is successfully finished. If it is found successful, the process advances to step S41. If the file transfer failed, the process branches to step S45.

[S41] Upon successful completion of the file transfer, the download controller J13 in the terminal computer T11 informs the download agent E11a of the setup control information specifying a destination file name F22 and automatic installation mode.

[S42] The download agent E11a in the terminal computer T11 examines the received setup control information.

[S43] It is examined whether an automatic installation mode is specified in the setup control information. If the automatic installation mode is specified, the process advances to step S44. Otherwise, the process skips step S44.

[S44] Since the automatic installation is specified, the download agent E11a in the terminal computer T11 invokes the resource installation processor K11 to set up the new resource "Player #1," which is now stored as a file F22, into the system environment.

[S45] The download controller J13 in the terminal computer T11 clears the connection to the download controller J11 in the resource server A11.

[S46] The download agent E11a in the terminal computer T11 reports the result status of download process (i.e., normal end or abnormal end) to the download controller J13.

[S47] The download agent E11a in the terminal computer T11 returns the control to the operating system (OS), thereby unloading itself.

[S48] The download controller J13 in the terminal computer T11 reports the result status (i.e., normal end or abnormal end) of the download process to the download controller J12 in the application server A12.

[S49] The download controller J12 in the application server A12 clears the connection to the download controller J13 in the terminal computer T11.

[S50] The download controller J12 in the application server A12 notifies the application manager I11 of the completion of the download process with its result status (i.e., normal end or abnormal end).

[S51] It is checked whether the downloading was successful throughout the process. If it was successful, the process advances to step S52. If the downloading was aborted because of some failure, the process advances to step S54.

[S52] Since it is confirmed that the downloading was finished without problem, the application manager I11 in the application server A12 transfers the video data file X1 to the application launching processor I12.

[S53] The application launching processor I12 in the terminal computer T11 activates the movie player application titled "Player #1" in the local resource file FIG. 22 to replay the video data X1.

[S54] Since the downloading was not completed, the application manager I11 sends an error message to the terminal computer T11.

The present invention is not limited to the above-described construction but can also be implemented in the following configuration, although it is not shown in the accompanying drawings. In this alternative embodiment of the present invention, the download agent E11a downloaded from the application server A12 will be uploaded to the resource server A11 as a counterpart of the download agent E11a in the terminal computer T11. The two download agents can communicate with each other and perform downloading of a resource file from the application server A12 to the terminal computer T11.

The above discussion will be summarized as follows. When a user selects an application at a terminal computer, a corresponding application server (i.e., a server computer that provides the selected application) will deliver a download agent to support downloading of necessary resources for the selected application. The download agent fetches necessary resource files from a relevant resource server to the requesting terminal computer, and when this task is completed, the download agent unloads itself.

Consequently, the terminal computer receives only a limited number of resource files for each application on demand, thus preventing its local disk storage from unnecessary consumption.

The present invention also enables the terminal users to load and use the most suitable resources for their purposes automatically, or with their knowledge.

This feature reduces the load of a system operator who manages downloadable resources in the resource server.

Furthermore, since downloadable resources are concentrated in a resource server computer dedicated to the resource storage and delivery services, the maintenance of those resources can be performed in a unified manner. The download agent is managed and maintained in an application server computer that provides the terminal users with various applications. Therefore, the users are free from troublesome maintenance of downloadable resources.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A remote resource management system for maintaining remote resources shared in a distributed computing system, in which a plurality of computers, including an application server computer providing application services and a resource server computer providing resources for the application services, are interconnected by a network and the shared remote resources are downloaded from the resource server computer to a requesting computer on demand, the remote resource management system comprising:

a downloadable resource storage device, disposed in the resource server computer, storing downloadable resources each including at least one file;

a downloadable resource manager, disposed in the resource server computer, managing information concerning the downloadable resources;

a download agent, which is stored in the application server computer on the network and runs on the requesting computer after being delivered to the requesting computer in response to a request from the requesting computer, executing a download operation to fetch one of the downloadable resources required to operate an application requested by the requesting computer from said downloadable resource storage device, depending on contents of selected files requested by the download agent on the requesting computer; and a local resource information manager, disposed in the requesting computer, storing information concerning local resources in the requesting computer, under control of said download agent that is delivered to the requesting computer;

the distributed computing system includes an application server computer which provides the application selected by the requesting computer; and said download agent, when being delivered to the requesting computer, carries information concerning a required application environment in the application server computer to the requesting computer, determines information concerning a required resource by comparing the information concerning the required application environment with the information concerning the local resources that is stored in said local resource information manager, and sends the determined information concerning the required resource to the resource server computer so as to initiate downloading of the required resource from said downloadable resource storage device.

2. The remote management system according to claim 1, wherein said download agent delivered to the requesting computer is unloaded from the requesting computer after execution of the downloading operation.

3. The remote resource management system according to claim 1, further comprising a resource linkage manager, disposed in the application computer that stores said download agent, managing dynamic linkage information that defines a relationship between the downloadable resources and the resource server computer storing the downloadable resources.

4. The remote resource management system according to claim 3, wherein said downloadable resource manager is linked to said resource linkage manager by using common logical names, thereby enabling the information concerning the downloadable resources to be dynamically added and/or altered, independent of said resource linkage manager.

5. A remote resource management system according to claim 3, wherein said resource linkage manager is linked to said downloadable resource management by using common logical names, thereby enabling the information concerning the downloadable resources to be dynamically added, altered, and/or deleted, independent of said downloadable resource manager.

6. The remote resource management system according to claim 1, wherein the requesting computer, after receiving said download agent, uploads the same download agent to the resource server computer, and allows the two download agents in the requesting computer and resource server computer to communicate with each other, thereby executing the downloading operation for the required resource.

7. The remote resource management system according to claim 1, wherein the resource server computer comprises a download controller for executing the downloading operation for the required resource by communicating with said download agent.

8. A remote resource management system according to claim 1, wherein said downloadable resource manager treats two resources with different version numbers as separate resources.

9. A remote resource management method of maintaining remote resources shared in a distributed computing system, where a network interconnects a plurality of computers including an application server computer to provide applications, a resource server computer to manage downloadable resources, and a requesting computer in need of the downloadable resources to use an application, the remote resource mnanagement method comprising:

upon selection of an application at the requesting computer, sending information indicative of the selected application;

delivering a download agent from the application server computer to the requesting computer to execute a downloading operation;

checking local resources including contents of selected files installed in the requesting computer, under control of the download agent that is delivered to the requesting computer;

if a latest resource necessary for the selected application is not present in the requesting computer, downloading the latest resource required to operate the selected application requested by the requesting computer from the resource server computer to the requesting computer, by using a function of the download agent; and unloading the download agent when the download operation is finished.

10. A remote resource management method according to claim 9, wherein said delivering a download agent also delivers, along with the download agent, information concerning the resource server computer that manages the resource necessary for the selected application.

11. A remote resource management method according to claim 9, further comprising:

examining what installation mode is specified, wherein the installation mode defines how to install the downloaded resource into the requesting computer;

setting up the downloaded resource to the requesting computer, when an automatic installation is specified as the installation mode;

examining whether the requesting computer has to be restarted, to allow new setup to take effect; and aborting the application and restarting the requesting computer if the requesting computer has to be restarted, the four former operations being inserted between the downloading the latest resource and the unloading the download agent.

12. A remote resource management method according to claim 11, wherein said setting up the downloaded resource is automatically achieved by the download agent working together with an operating system of the requesting computer.

13. A remote resource management method according to claim 11, wherein said setting up the downloaded resource is performed by an installation process invoked by the download agent.

14. A remote resource management method according to claim 11, wherein said examining is automatically achieved by the download agent working together with an operating system of the requesting computer.

15. A remote resource management method according to claim 11, wherein said examining is performed by the download agent, based on resource management information under control of the resource server computer.

16. A computer-readable medium encoded with a computer program to implement:

a downloadable resource manager centrally managing information concerning downloadable resources shared in a distributed computing system; and a download agent, to be delivered to a requesting computer in response to a request from the requesting computer, executing a download operation to fetch one of the downloadable resources required to operate an application requested by the requesting computer depending on contents of selected files requested by the download agent on the requesting computer.

17. A remote resource management system for maintaining remote resources shared in a distributed computing system, in which a plurality of computers, including an application server computer providing application services and a resource server computer providing resources for the application services, are interconnected by a network and the shared remote resources are downloaded from the resource server computer to a requesting computer on demand, the remote resource management system comprising:

a download agent, which is stored in the application server computer on the network and runs on the requesting computer after being delivered to the requesting computer in response to a request from the requesting computer, executing a download operation to fetch one of the downloadable resources, according contents of selected files requested by the download agent on the requesting computer.

18. A remote resource management system comprising:

a requesting computer storing local resource information including files stored on the requesting computer;

an application server storing downloadable resource information stored on the application server;

a download agent which is transferred from the application server to the requesting computer, and executed on the requesting computer; and said download agent, when executed by the requesting computer, determines desired files by examining selected files in the local resource information and the downloadable resource information, and fetches the desired files from the application server.

19. The remote resource management system of claim 18, wherein said download agent is capable of being uploaded back from the requesting computer to the application server where it can be executed on the application server.

20. A remote resource management method comprising:

selecting an application on a requesting computer;

delivering a download agent from an application server to the requesting computer;

after being delivered, said download agent performing on the requesting computer checking local resources including selected files present on the requesting computer;

determining required files using the local resources; and fetching the required files from the application server.

21. The remote resource management method of claim 20, further comprising uploading the download agent from the requesting computer to the application server where it can be executed on the application server.

22. A computer readable storage medium storing software for performing:

delivering a download agent from an application server to the requesting computer;

after being delivered, said download agent performing checking local resources including selected files present on the requesting computer;

determining required files using the local resources; and fetching the required files from the application server.

23. The computer readable storage medium as in claim 22, wherein said download agent is capable of being uploaded back from the requesting computer to the application server where it can be executed on the application server.

* * * * *

UNITED STATES PATENT AND TRADEMARK OFFICE
CERTIFICATE OF CORRECTION

PATENT NO. : 6,195,678 B1
DATED : February 27, 2001
INVENTOR(S) : Toshinao Komura It is certified that error appears in the above-identified patent and that said Letters Patent is hereby corrected as shown below:

Title page,
Item [56], References Cited,

Please insert -- 5,588,148    12/1996    Landis et al.    707/1    09/1994 --

Signed and Sealed this

First Day of January, 2002

*Attest:*

*Attesting Officer*

JAMES E. ROGAN
*Director of the United States Patent and Trademark Office*